US009856120B2

(12) United States Patent
Kim et al.

(10) Patent No.: US 9,856,120 B2
(45) Date of Patent: Jan. 2, 2018

(54) TRANSPORTATION DEVICE AND TRANSPORTATION SYSTEM USING SAME

(71) Applicants: POSCO, Pohang-si, Gyeongsangbuk-do (KR); KWANGYANG MARINE CO., LTD., Gwangyang-si, Jeollanam-do (KR); KILWOO CORPORATION, Jung-gu, Seoul (KR)

(72) Inventors: Tae-Han Kim, Seongnam-si (KR); Kyoung-Hee Lee, Goyang-si (KR); Jong-Won Yoon, Seoul (KR)

(73) Assignees: POSCO, Gyeongsangbuk-do (KR); KWANGYANG MARINE CO., LTD., Jeollanam-do (KR); KILWOO CORPORATION, Seoul (KR)

( * ) Notice: Subject to any disclaimer, the term of this patent is extended or adjusted under 35 U.S.C. 154(b) by 275 days.

(21) Appl. No.: 14/383,796

(22) PCT Filed: Dec. 27, 2012

(86) PCT No.: PCT/KR2012/011534
§ 371 (c)(1),
(2) Date: Sep. 8, 2014

(87) PCT Pub. No.: WO2013/133521
PCT Pub. Date: Sep. 12, 2013

(65) Prior Publication Data
US 2015/0110589 A1    Apr. 23, 2015

(30) Foreign Application Priority Data

Mar. 9, 2012    (KR) .................. 10-2012-0024320

(51) Int. Cl.
*B60P 3/00*        (2006.01)
*B66C 19/00*       (2006.01)
(Continued)

(52) U.S. Cl.
CPC .......... *B66C 19/005* (2013.01); *B60G 17/016* (2013.01); *B60P 1/00* (2013.01);
(Continued)

(58) Field of Classification Search
CPC .......... B60G 2300/38; B60G 2800/203; B60G 2300/37; B60P 1/00; B60P 1/025; B66C 19/005; B66C 1/30; B62D 7/1509
(Continued)

(56) References Cited

U.S. PATENT DOCUMENTS 2,410,965 A    11/1946  Dimick
3,315,829 A *   4/1967  Cellini .................. B66C 19/005
                                                414/459
(Continued)

FOREIGN PATENT DOCUMENTS

CN          1373719       10/2002
JP          62-172630     11/1987
(Continued)

OTHER PUBLICATIONS

English-language Supplementary Extended European Search Report in counterpart EP 12870551.4 dated Jun. 6, 2016.
(Continued)

*Primary Examiner* — Anna Momper
*Assistant Examiner* — Mark Hageman
(74) *Attorney, Agent, or Firm* — Finnegan, Henderson, Farabow, Garrett & Dunner, LLP

(57) ABSTRACT

Provided are a transportation device for transporting heavy plate-shaped cargoes such as thick plate products, and a transportation system using the transportation device. The transportation device may include: a device body unit; a device moving unit provided on the device body unit to move the transportation device; and a cargo loading unit provided on the device body unit for self-loading cargo. The
(Continued)

transportation device is capable of rapidly loading and transporting plate-shaped heavy objects such as thick plate products of an iron mill without using additional lifting/unloading apparatuses and heavy pallets (cassettes) for markedly decreasing the total transportation (distribution) time necessary for lifting, transportation, and unloading of cargo, providing efficient transportation environments, improving productivity, and decreasing costs.

14 Claims, 19 Drawing Sheets

(51) Int. Cl.
*B60P 1/00* (2006.01)
*B63B 27/14* (2006.01)
*B62D 7/02* (2006.01)
*B62D 7/15* (2006.01)
*B60G 17/016* (2006.01)
*B63B 27/00* (2006.01)
*B66C 1/30* (2006.01)
*B60P 1/02* (2006.01)
*B62D 61/10* (2006.01)

(52) U.S. Cl.
CPC .............. *B60P 1/025* (2013.01); *B62D 7/026* (2013.01); *B62D 7/1509* (2013.01); *B63B 27/02* (2013.01); *B63B 27/14* (2013.01); *B66C 1/30* (2013.01); *B60G 2300/37* (2013.01); *B60G 2300/38* (2013.01); *B60G 2800/203* (2013.01); *B62D 61/10* (2013.01)

(58) Field of Classification Search
USPC ................................................ 414/459, 460
See application file for complete search history.

(56) References Cited

U.S. PATENT DOCUMENTS

| | | | | |
|---|---|---|---|---|
| 3,707,238 A * | 12/1972 | Thibodeau, Sr. | ......... | B60P 3/00 414/458 |
| 4,286,915 A * | 9/1981 | LaBerdia | .............. | B66C 19/005 294/81.61 |
| 4,551,059 A * | 11/1985 | Petoia | ................... | B66C 19/005 414/459 |
| 2003/0180132 A1 * | 9/2003 | Morreim | ............... | B66C 19/005 414/458 |

FOREIGN PATENT DOCUMENTS

| | | |
|---|---|---|
| JP | 08-282359 | 10/1996 |
| JP | 2000-0072026 A | 3/2000 |
| JP | 2000-255308 A | 9/2000 |
| JP | 2007-290606 A | 11/2007 |
| KR | 2002-0016020 | 3/2002 |
| KR | 20-0359688 Y1 | 8/2004 |
| KR | 10-2009-0053473 A | 5/2009 |
| KR | 10-0955020 | 4/2010 |
| WO | WO 00/064700 A1 | 11/2000 |
| WO | WO 01-07289 | 2/2001 |
| WO | WO 2012-006846 | 1/2012 |

OTHER PUBLICATIONS

Notice of Office Action from the Japanese Patent Office dated Nov. 10, 2015, in counterpart Japanese Patent Application No. 2014-560844.
First Office Action dated Nov. 23, 2015, from the State Intellectual Property office of the People's Republic of China in Counterpart Chinese Patent Application No. 2012800730022.
International Search Report from the Korean Patent Office for International Application No. PCT/KR2012/011534 dated Apr. 16, 2013.

* cited by examiner

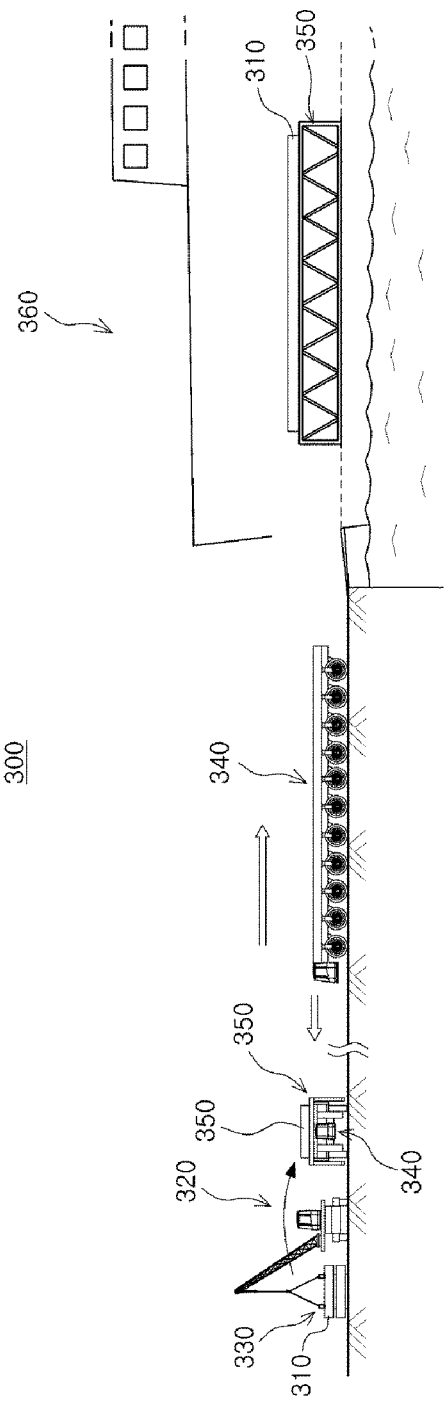
[Figure 1 -- PRIOR ART]

[Figure 2]
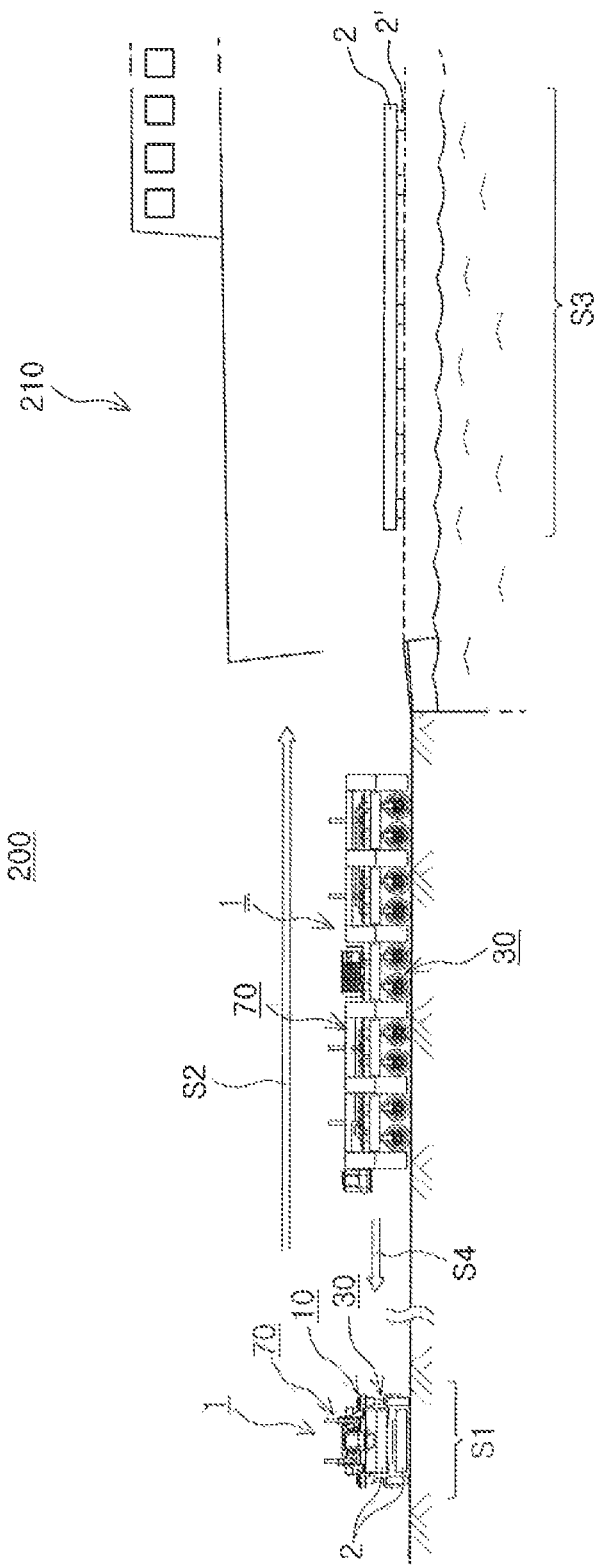

[Figure 3]
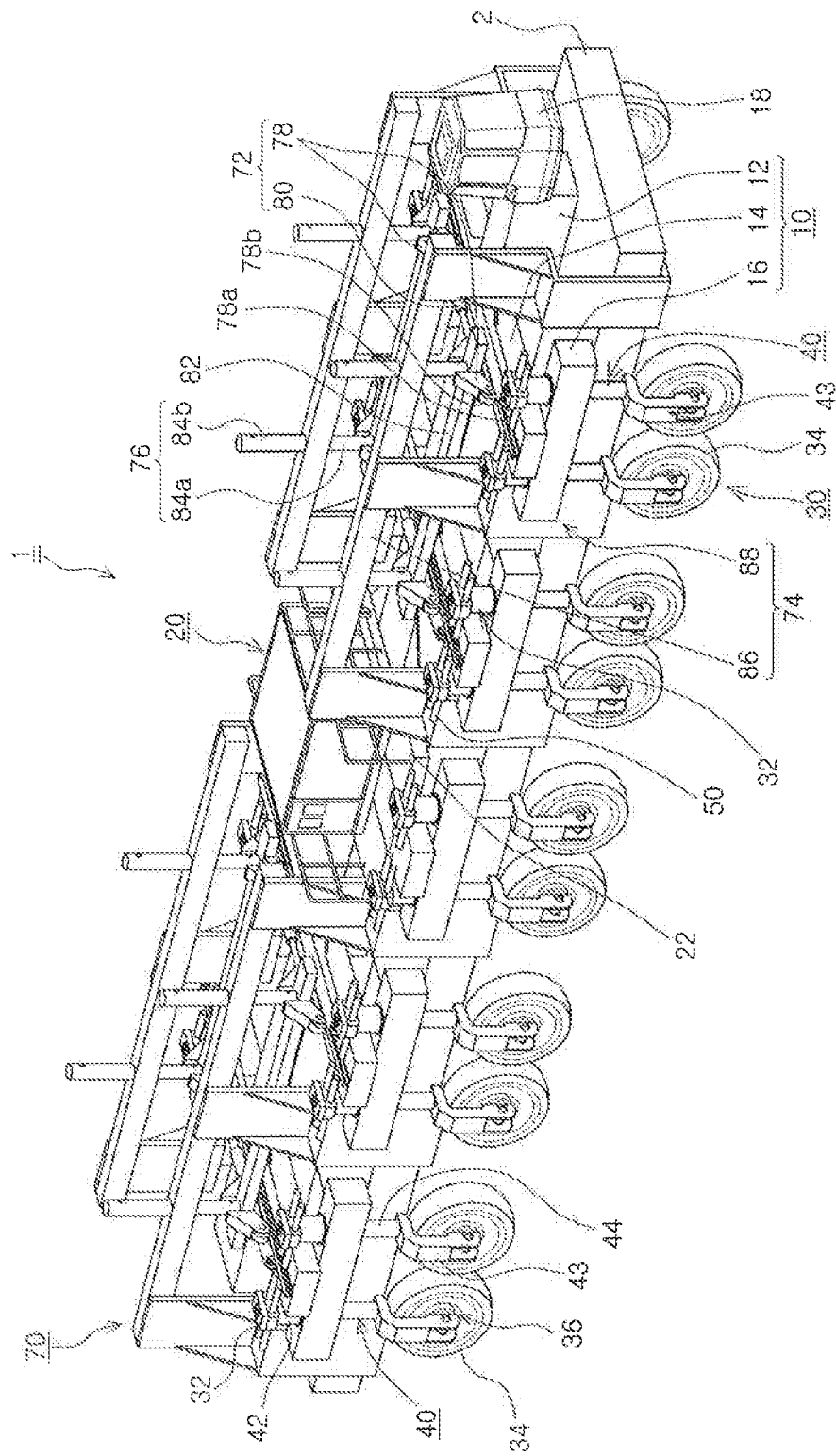

[Figure 4]
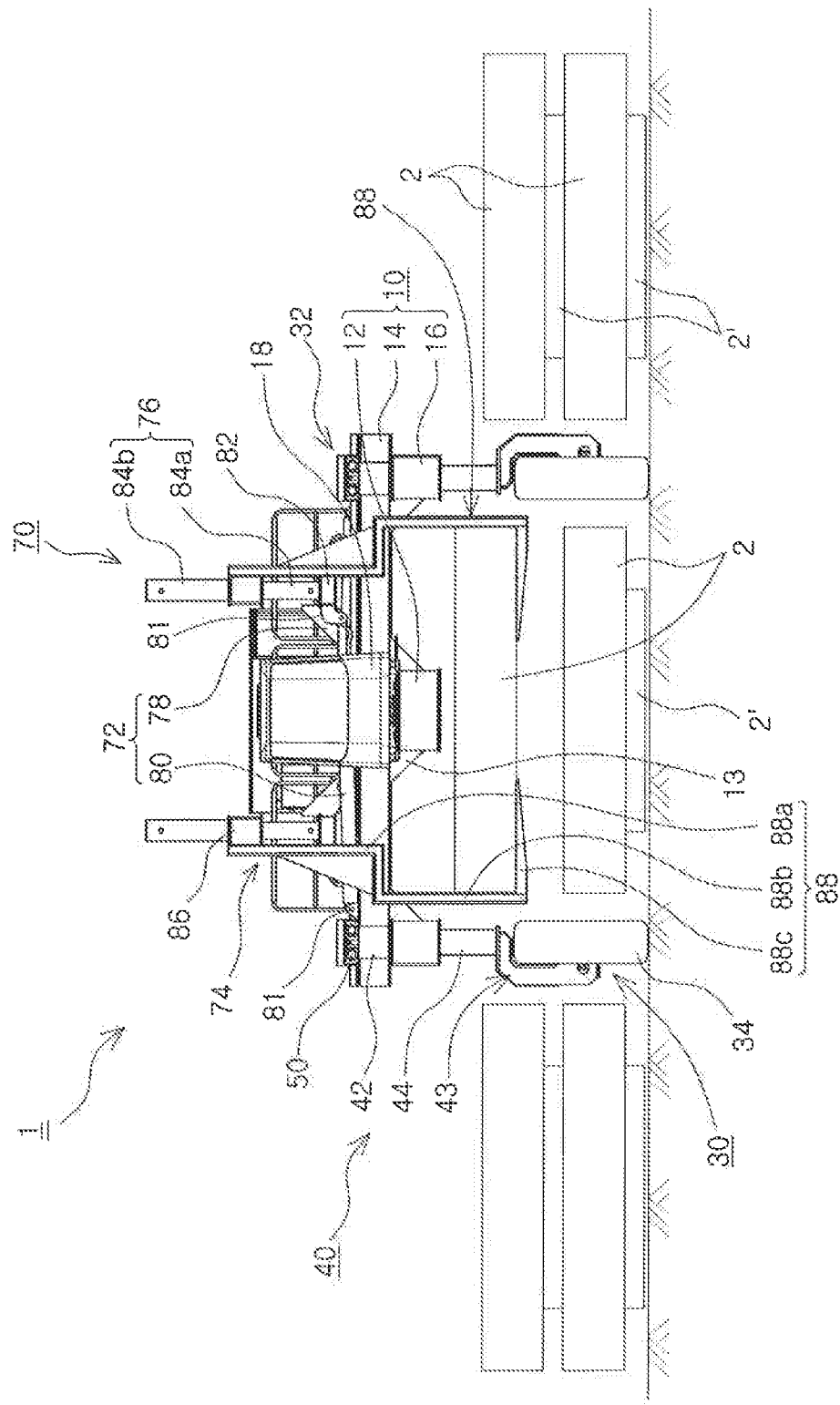

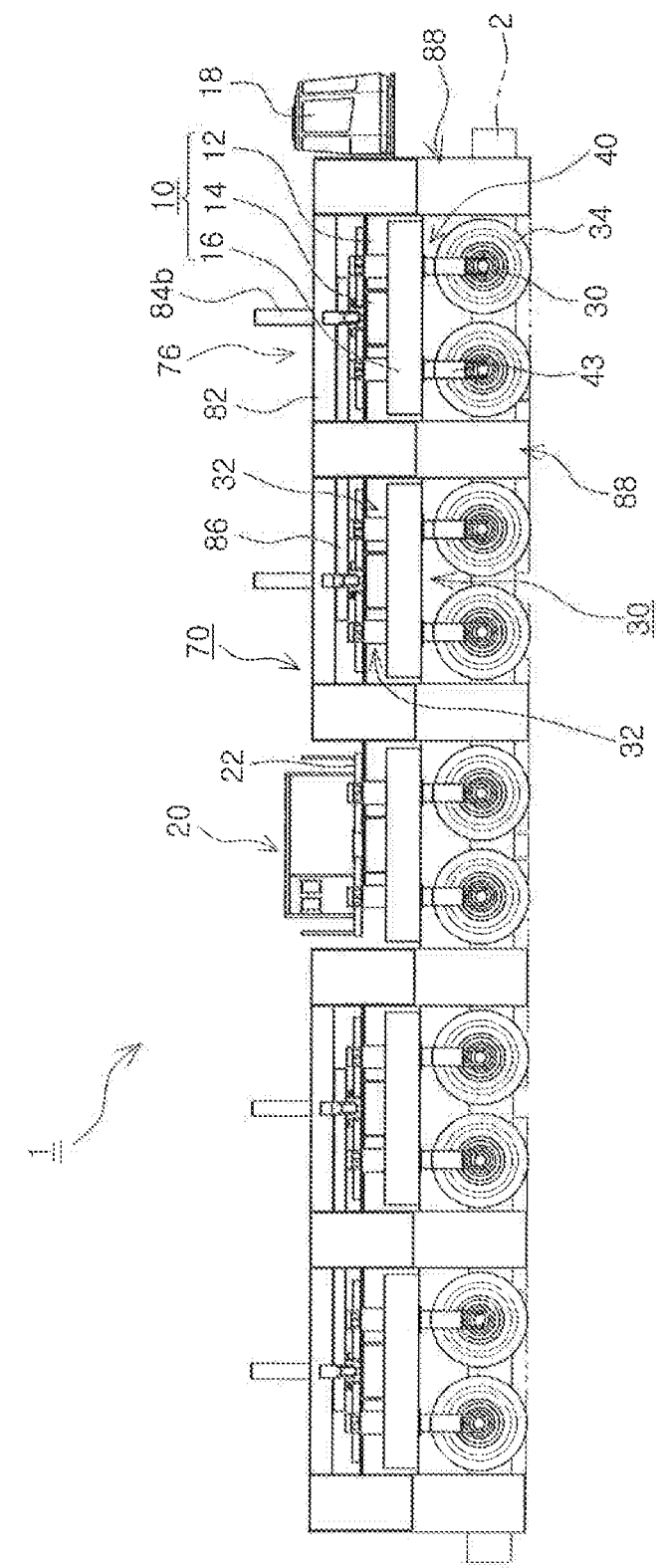
[Figure 5]

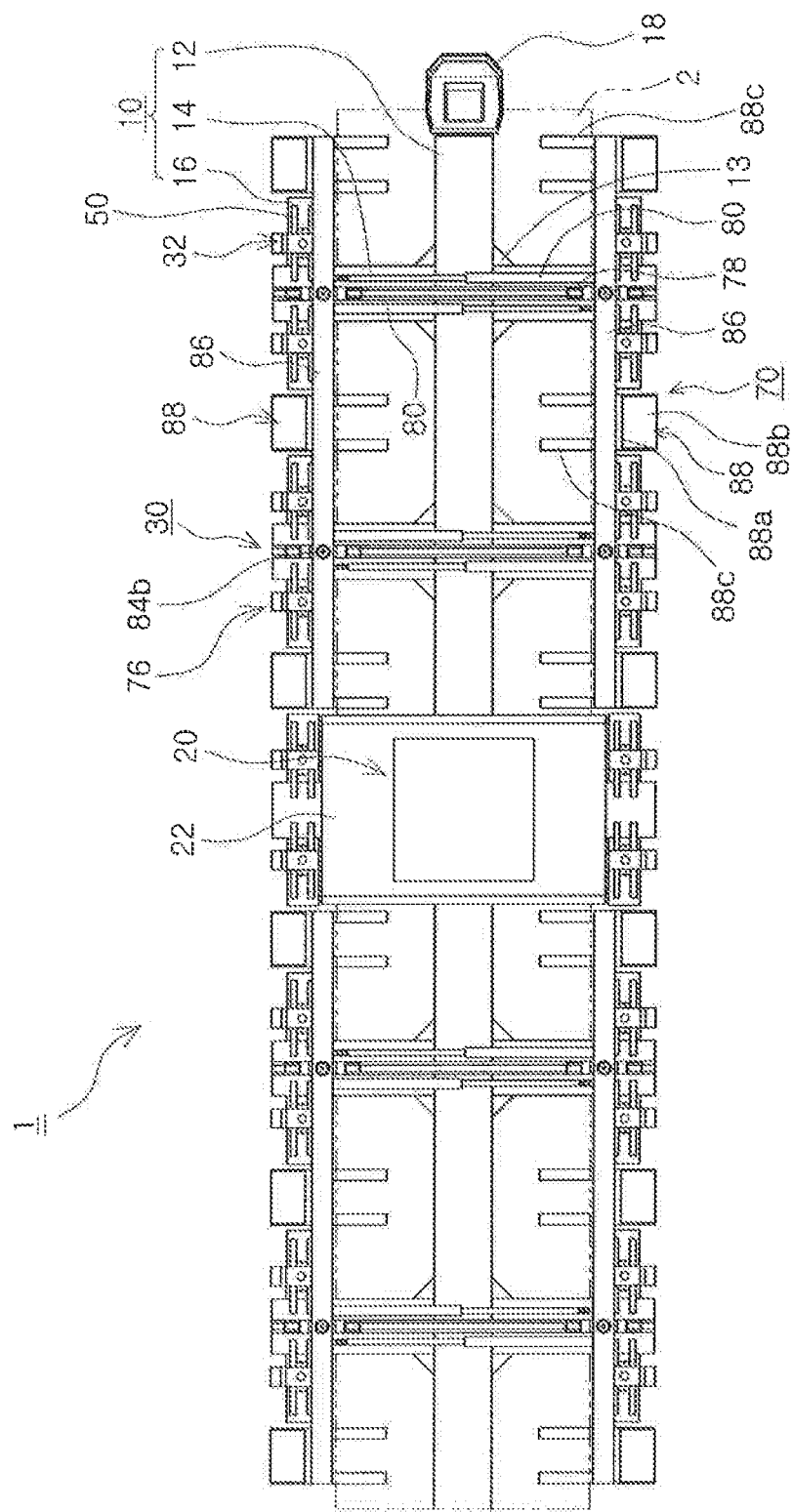
[Figure 6]

[Figure 7]
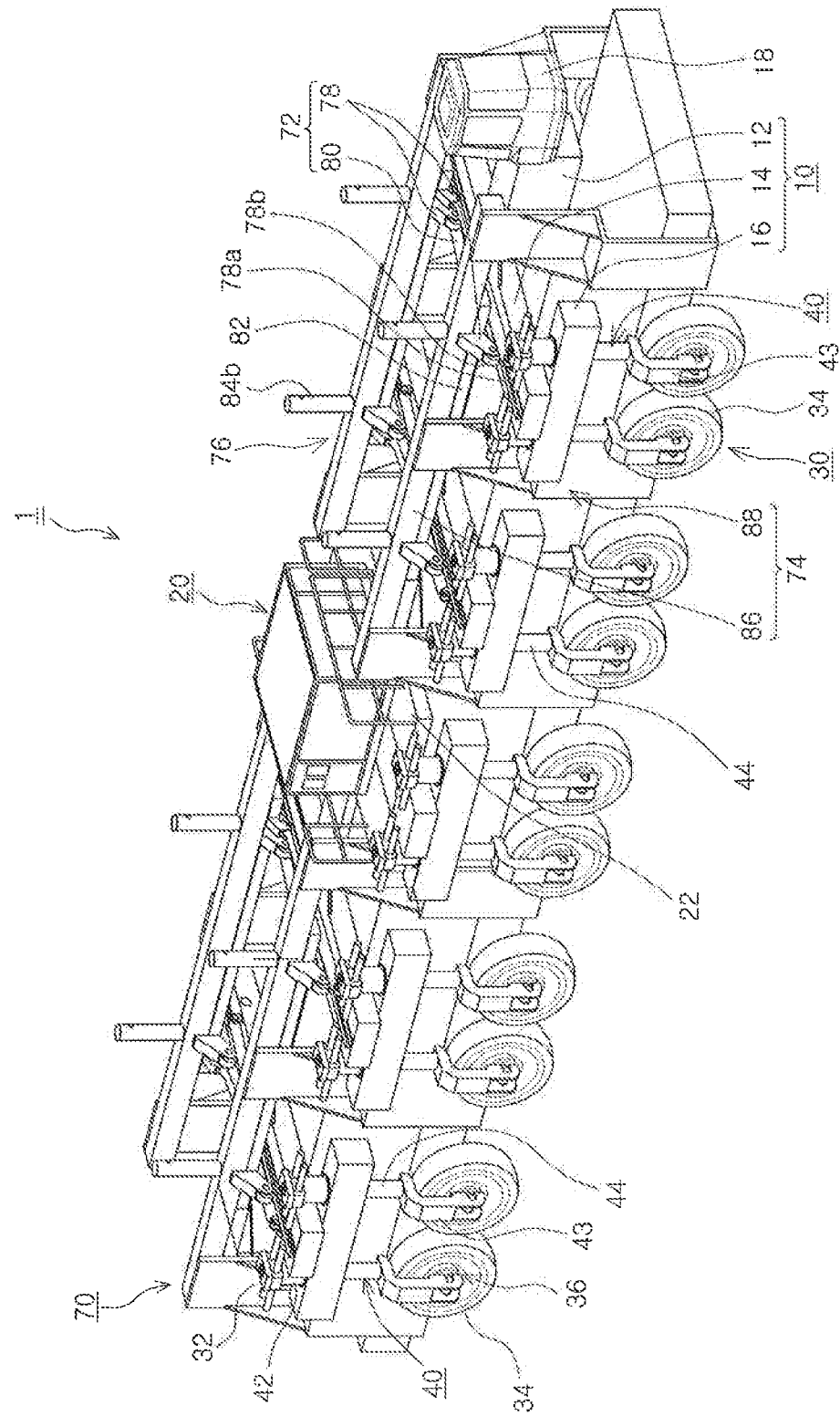

[Figure 8]
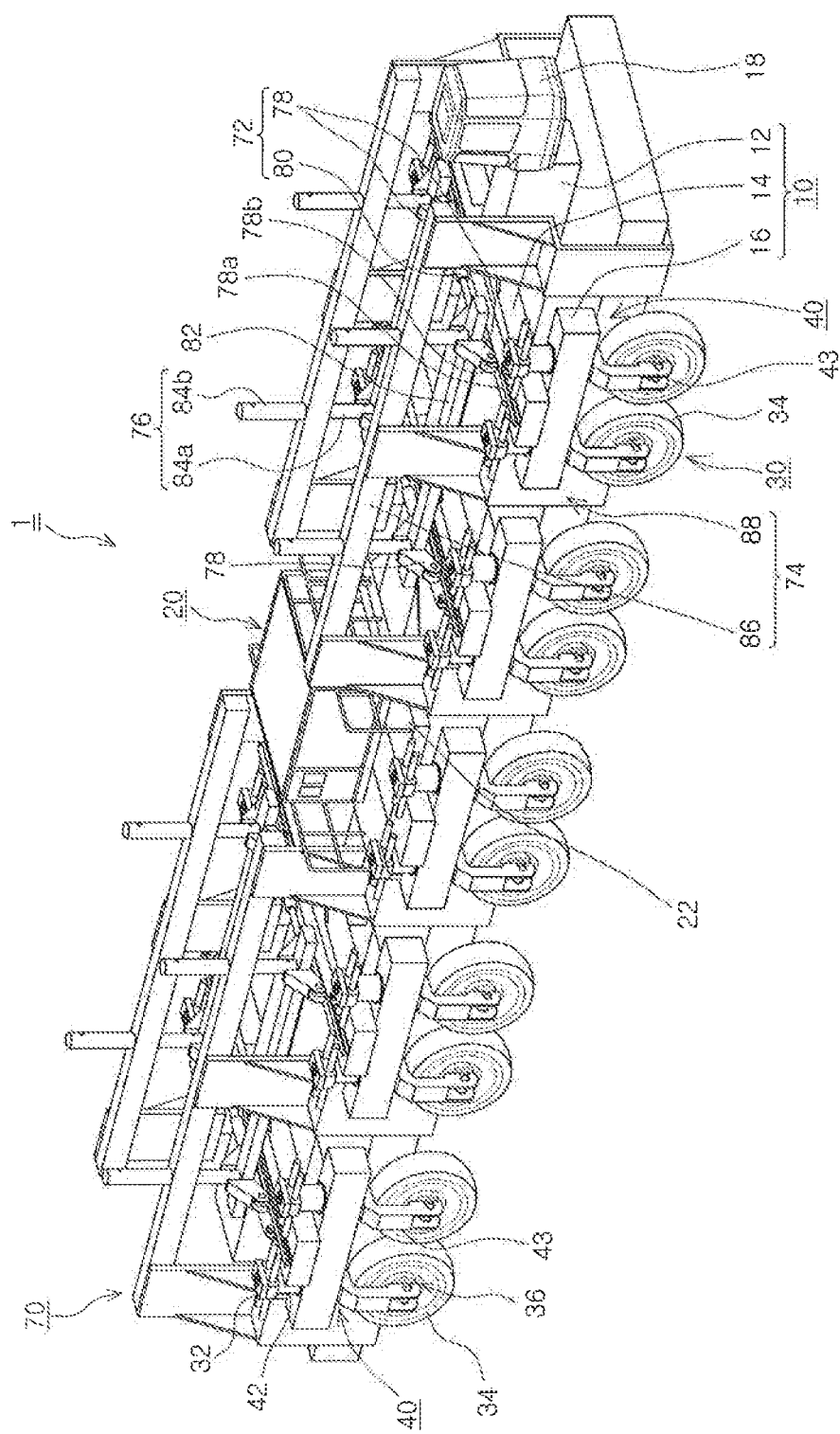

[Figure 9]
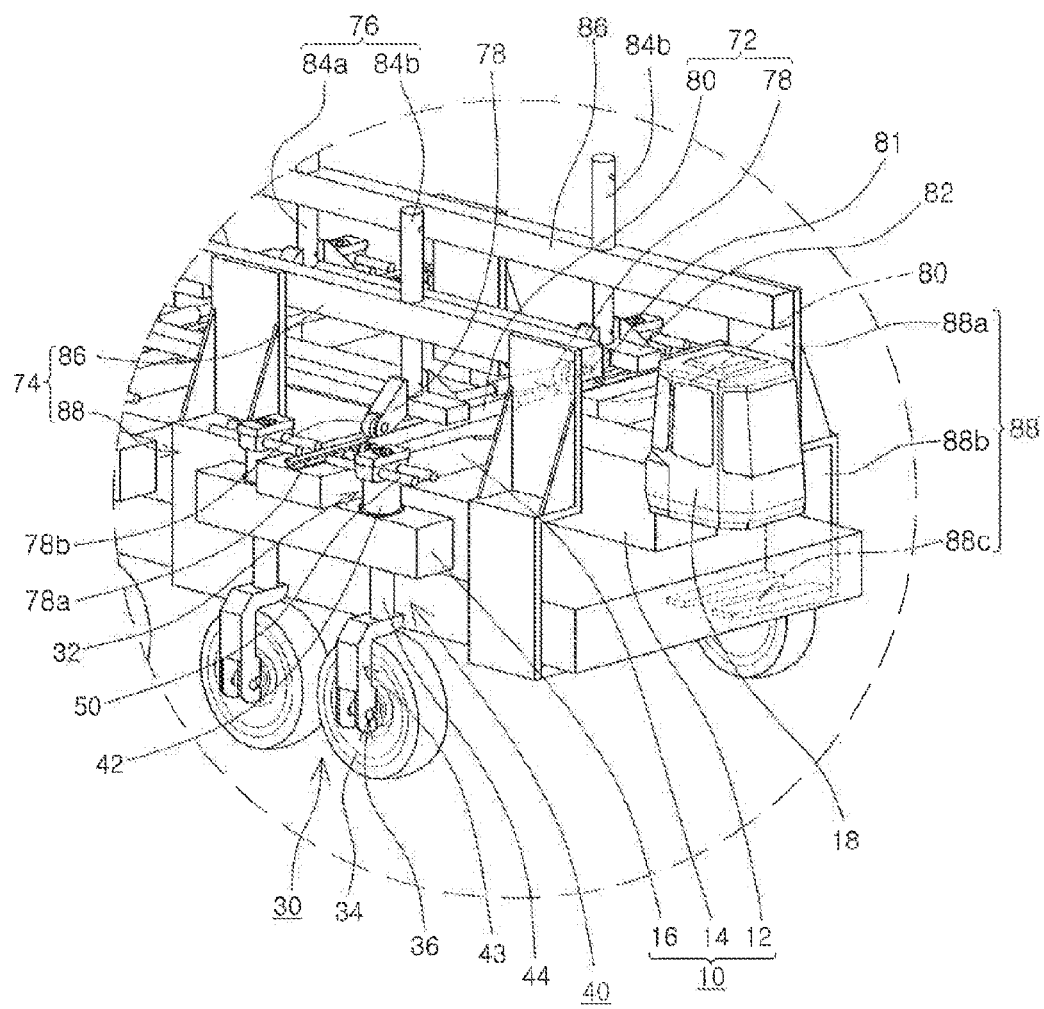

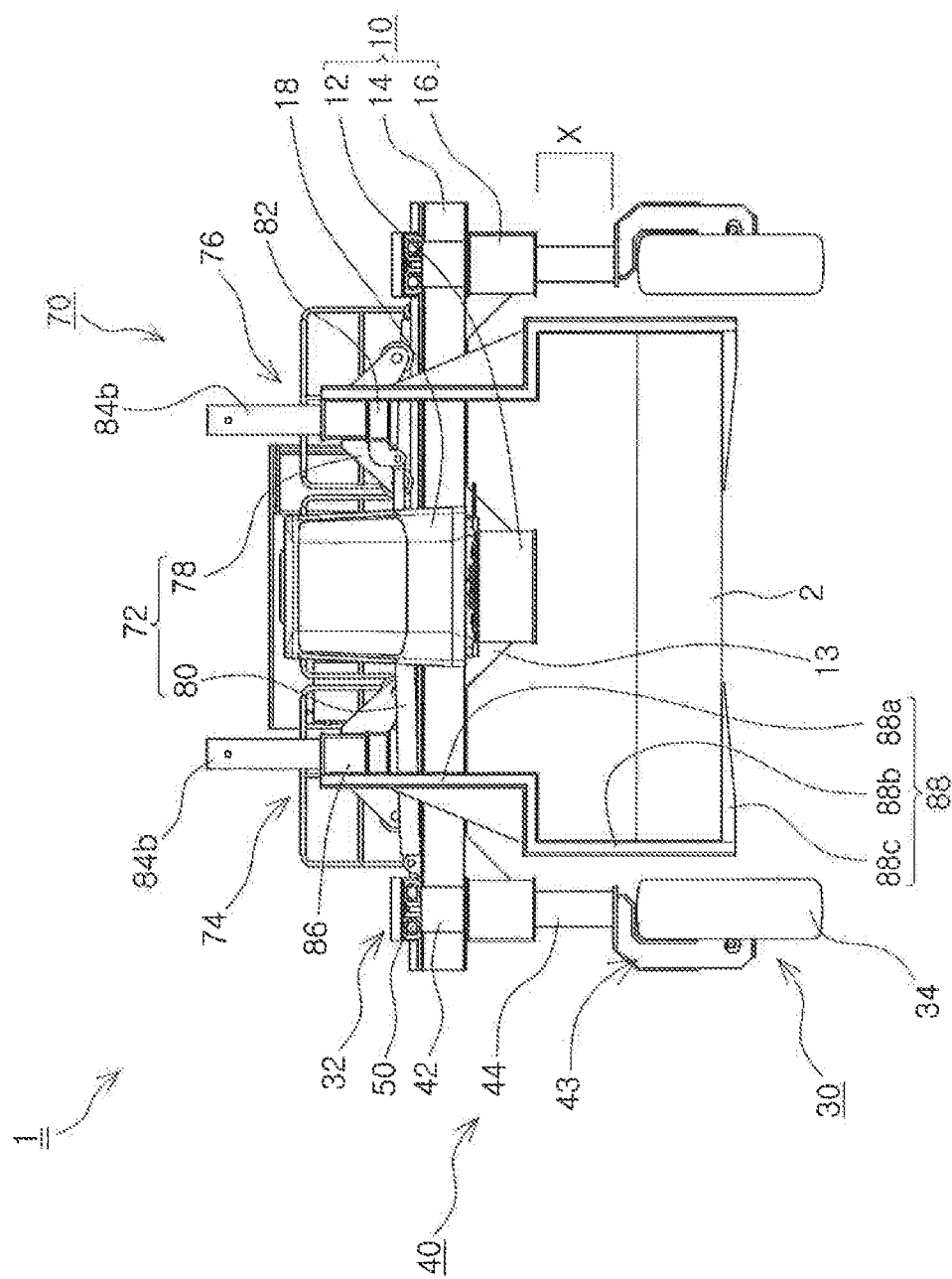
[Figure 10]

[Figure 11]
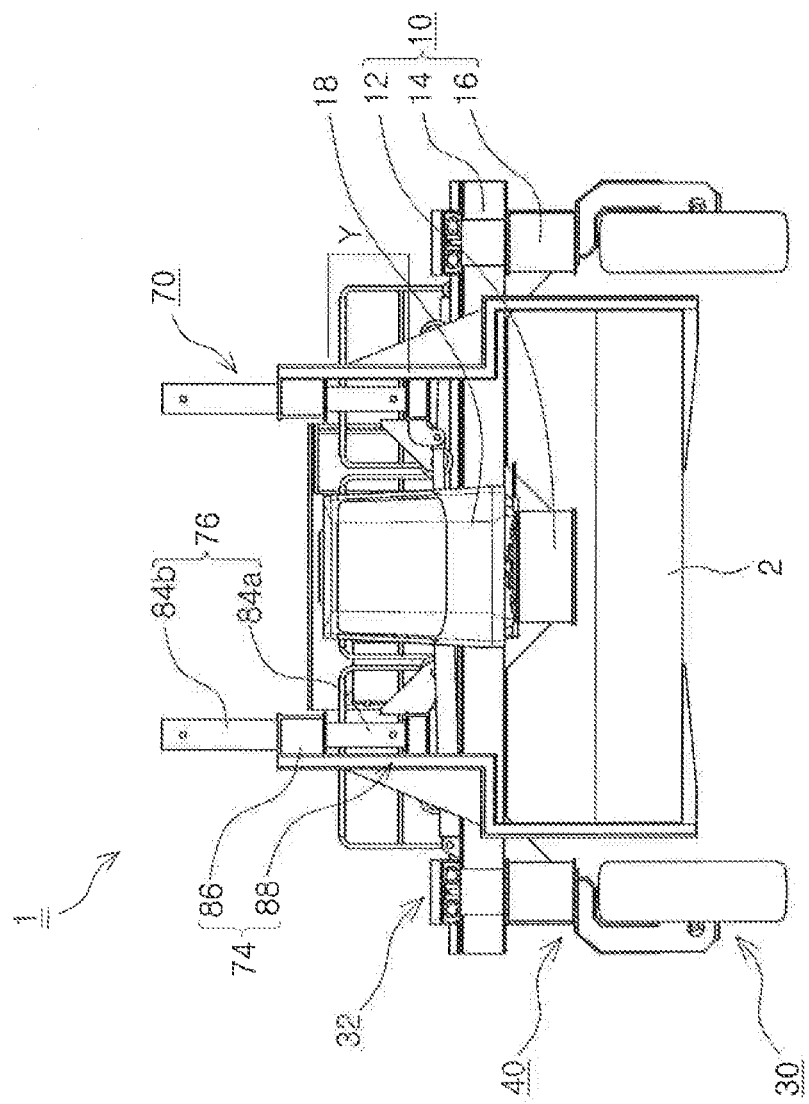

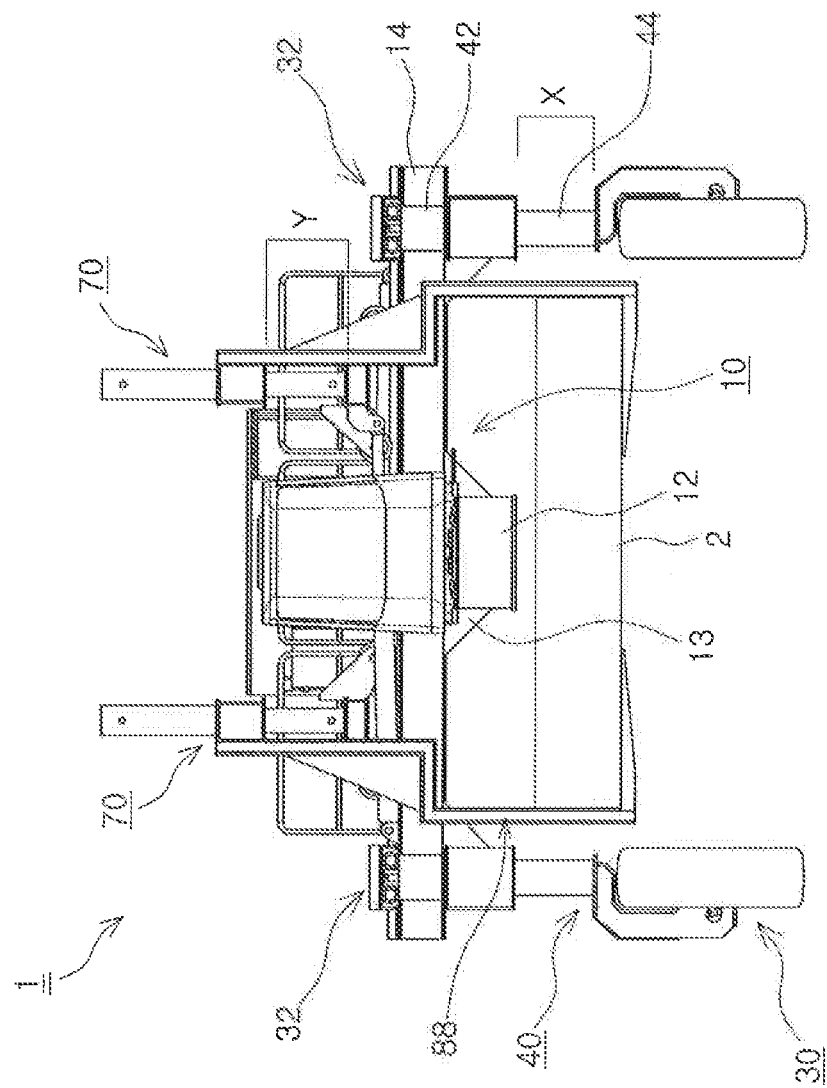
[Figure 12]

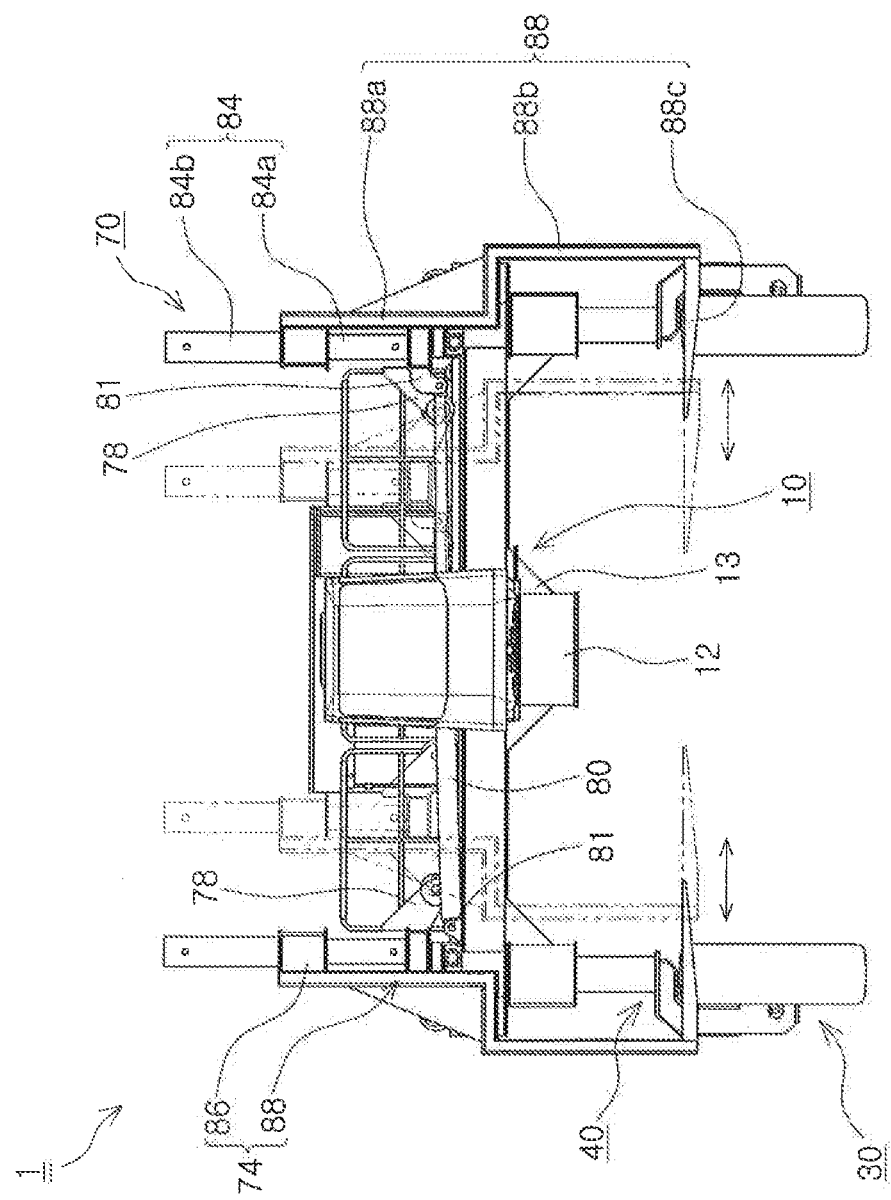
[Figure 13]

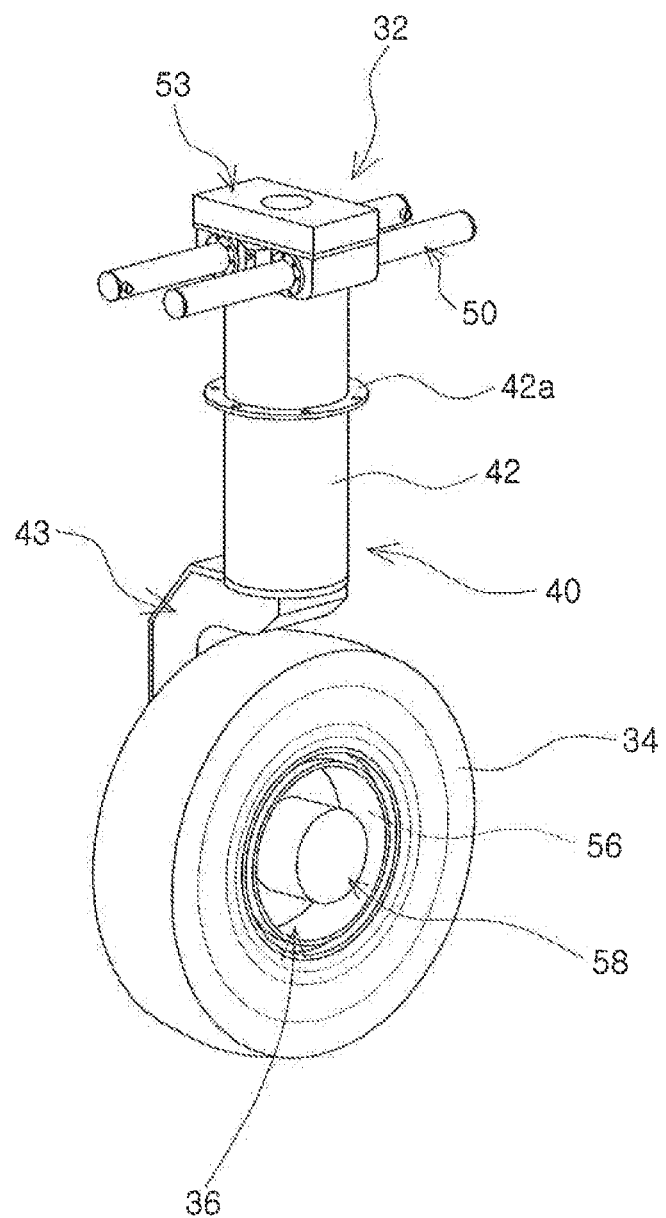
[Figure 14]

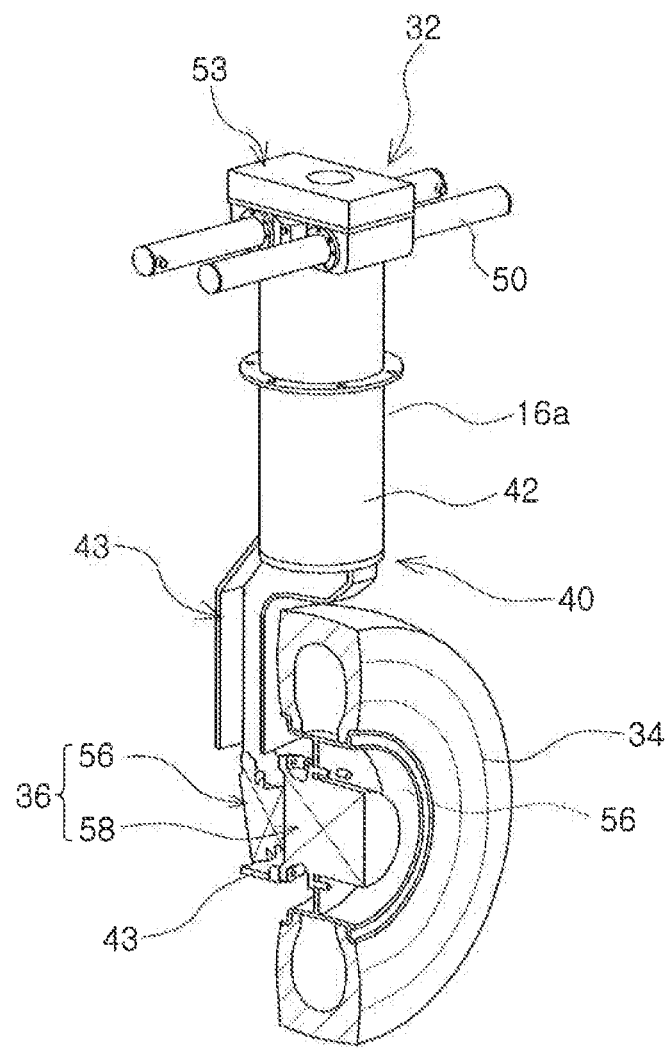
[Figure 15]

[Figure 16]
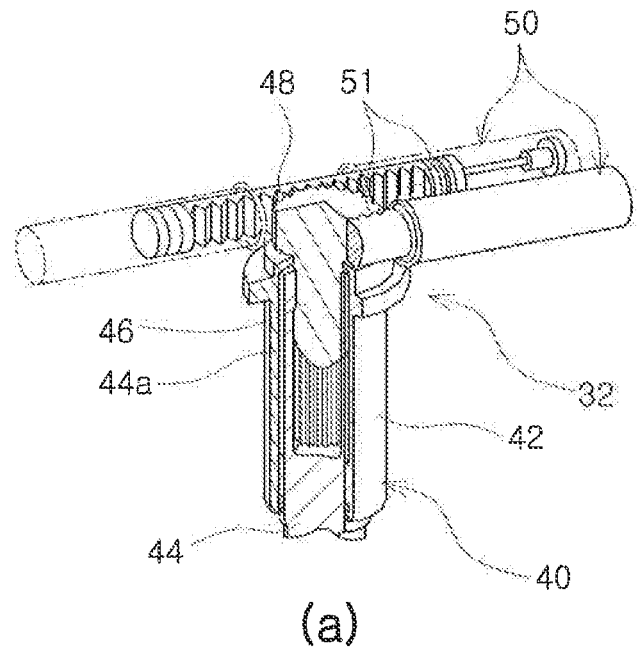
(a)
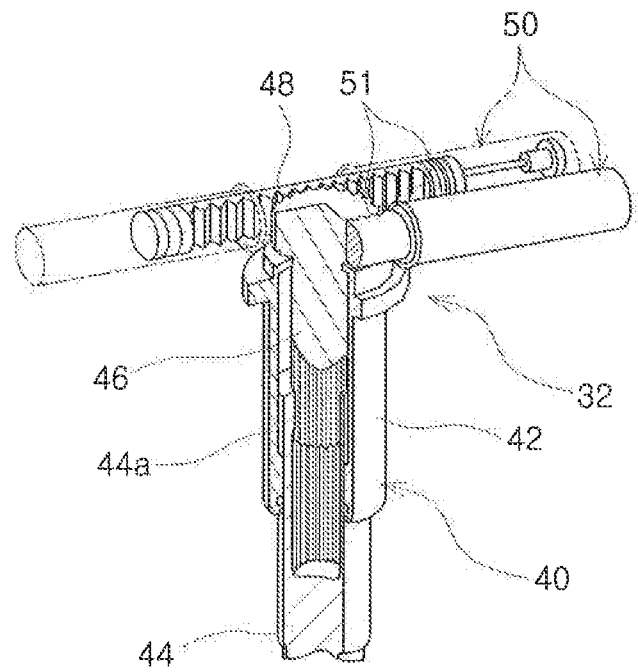
(b)

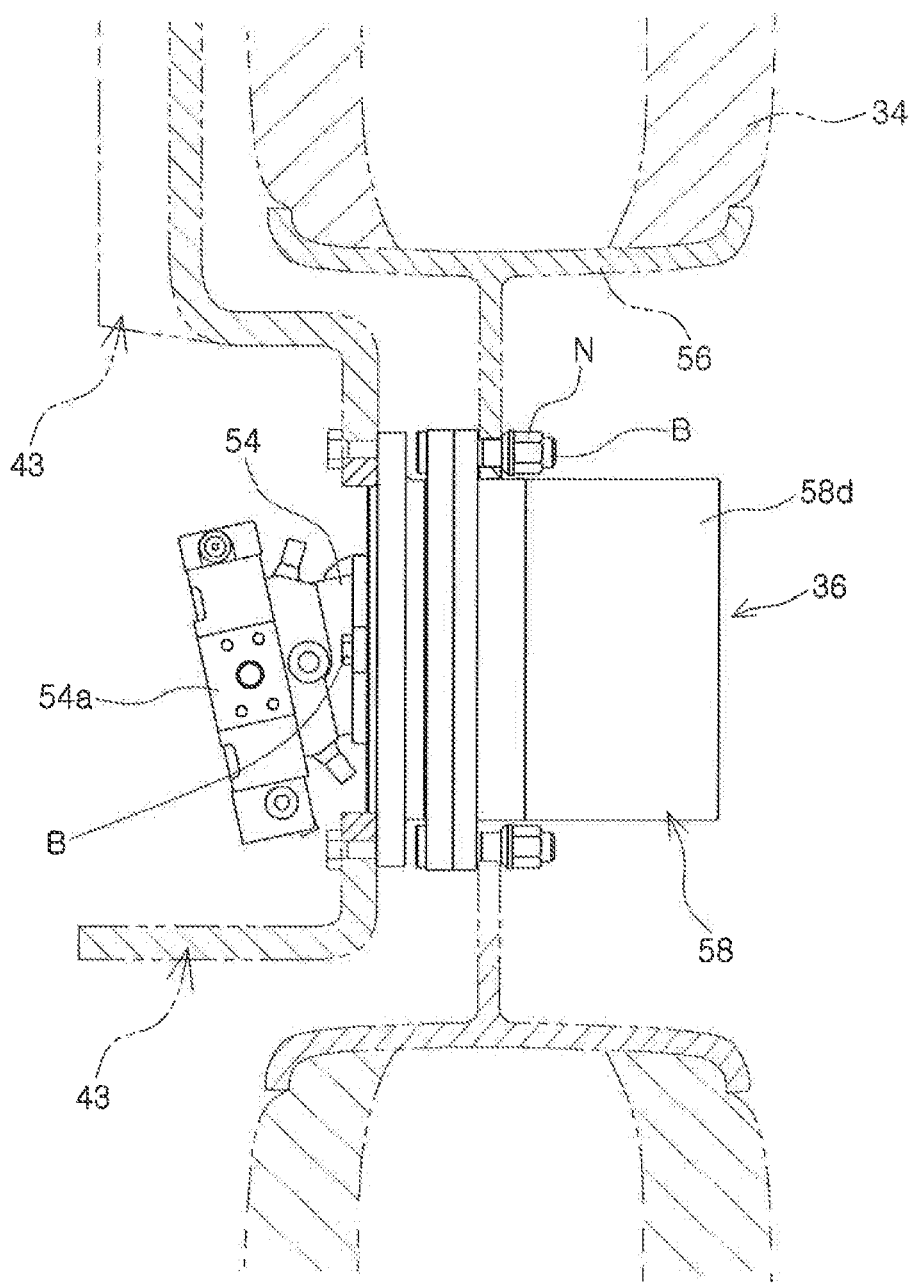
[Figure 17]

[Figure 18]
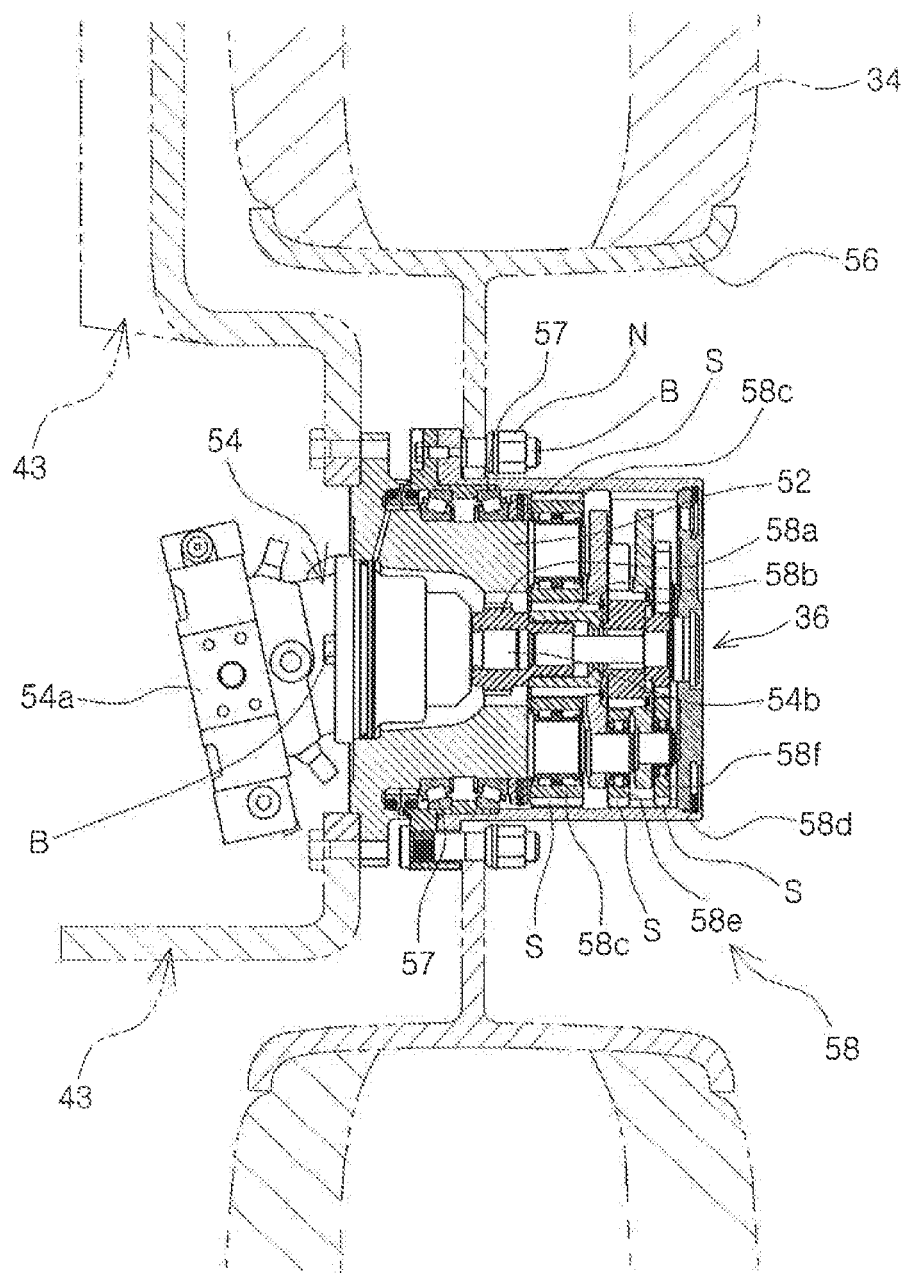

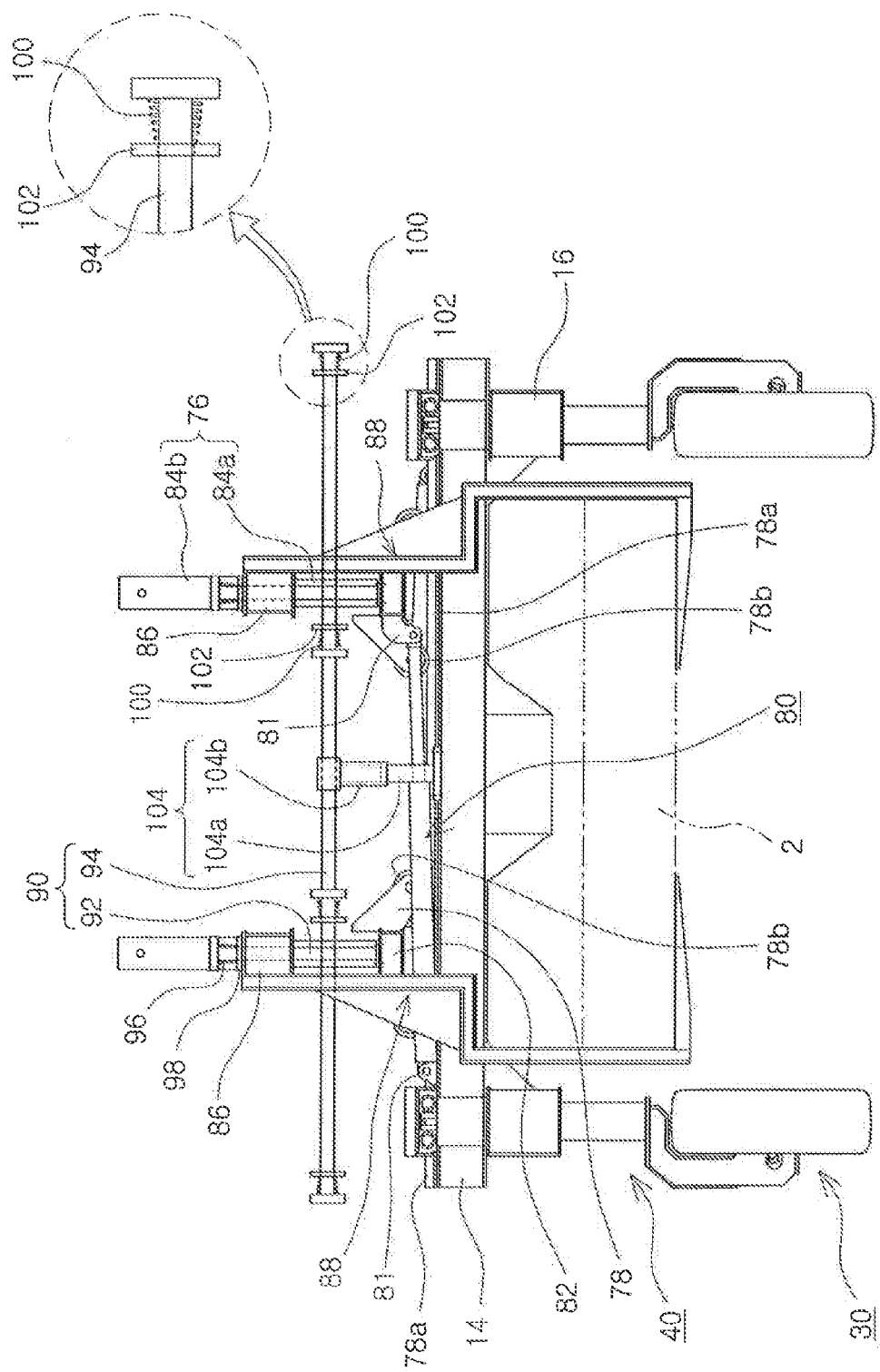
[Figure 19]

TRANSPORTATION DEVICE AND TRANSPORTATION SYSTEM USING SAME

CROSS REFERENCE TO RELATED PATENT APPLICATIONS

The present application is the national phase of International Application No. PCT/KR2012/011534, titled "TRANSPORTATION DEVICE AND TRANSPORTATION SYSTEM USING SAME", filed on Dec. 27, 2012, which claims the priority of Korean Patent Application No. 10-2012-0024320, filed with the Korean Intellectual Property Office on Mar. 9, 2012, all of which applications are incorporated herein in their entireties by reference.

TECHNICAL FIELD

The present disclosure relates to a transportation device and a transportation system using the transportation device, and more particularly, to a compact transportation device capable of rapidly loading and transporting heavy plate-shaped objects such as thick plate products from an iron mill, without using an additional lifting or unloading apparatus, or heavy pallets (cassettes), for markedly decreasing the total transportation (distribution) time necessary for the lifting, transportation, and unloading of cargo, providing efficient transportation environments, improving productivity, and decreasing costs, and a transportation system using the transportation device.

BACKGROUND ART

Recently, due to factors such as traffic environments or local climates, these has been a trend for rapid increases in transportation (logistics) costs. Particularly, since the amount of (significantly) heavy cargo that can be carried by a single transportation system (vehicle) is limited, heavy cargo incurs much higher transportation costs. In addition, significantly heavy cargo nub many limitations when being moved between production lines in a factory.

For example, it takes considerable time and costs to transport significantly heavy products from an iron mill such as plate-shaped slabs or steel sheets (particularly, thick plate products) within an iron mill itself or to ship such significantly heavy products for long-distance transportation.

Although products such as slabs are commonly carried between production lines in a factory within a relatively short distance, thick plate products are often transported using ship-based transportation (logistics) systems due to the sizes (weights) thereof.

For example, FIG. 1 illustrates a transportation system 300 (i.e., a shipping system) constructed using an existing transportation vehicle (i.e., an elevator type transporter of the related art).

As illustrated in FIG. 1, generally, a thick plate product 310 located in a yard is lifted onto a heavy iron pallet 350 by using a crane 320 and a lifting apparatus 330 (such as an electromagnetic block), and the pallet 350 on which the thick plate product 310 is disposed is carried to a ship 360 using an elevator type transporter 340.

Thereafter, the pallet 350 on which the thick plate product 310 is disposed is transported onto the ship 360, and only the elevator type transporter 340 returns to the yard for repeating the shipment of thick plate products 310.

As described above, a thick plate product is loaded on a ship together with a pallet on which the thick plate product is disposed, because it is difficult and cumbersome to move the thick plate product from the pallet to the ship using equipment, and the pallet is commonly reused when the thick plate product is unloaded from the ship after transportation.

Korean Patent Application Laid-open Publication No. 2002-0016020 discloses a pallet-related technique, and Korean Patent Registration No. 10-0955020 discloses an apparatus for lifting and unloading a significantly heavy object such as a slab similar to a thick plate product.

That is, as disclosed in the patent application and the registered patent, large equipment is necessary to lift a slab or thick plate (product) onto a transportation apparatus and unload the slab or thick plate product from the transportation apparatus, in addition to the necessity of a pallet for disposing the slab or thick plate product thereon. Particularly, since such a pallet is a heavy iron-component assembly weighing twenty tons or more, the manufacturing cost thereof is high.

Therefore, the above-described transportation system 300 for transporting thick plate products by using a pallet and an elevator type transporter of the related art has the following problems.

First, according to a method of the related art, additional equipment is used to lift and unload a thick plate product, and a pallet is used to accommodate a thick plate product thereon during transportation, thereby incurring additional costs for manufacturing and managing such additional equipment. Particularly, transportation (distribution) work may be retarded due to lifting and unloading operations, and the amount of cargo that can be shipped in a given period of time may be limited, thereby markedly increasing overall transportation (logistics) costs.

Secondly, a thick plate product is loaded on a ship together with a pallet used to accommodate the thick plate product thereon as illustrated in FIG. 1, and the pallet is reused when the thick plate product is unloaded from the ship. However, since such a pallet is relatively large and heavy, as described in the patent application, the available cargo space in a ship is consequently reduced, and since the pallet is transported as cargo, shipping costs are increased. That is, time and costs are wasted.

Thirdly, since a significantly heavy object handling operation is performed to lift such a thick plate product on a pallet or to unload the thick plate product from the pallet, accidents such as a heavy object falls, or accidents related to worker safety are likely to occur.

That is, transportation systems for transporting (shipping) thick plates (thick plate products) by a method using existing devices such as the pallet 350 and the elevator type transporter 340 illustrated in FIG. 1 have many problems.

In addition, since such a pallet and an elevator type transporter are used to carry slabs as well as thick plate products, problems similar to the above-described problems may be caused.

DISCLOSURE

Technical Problem

An aspect of the present disclosure may provide a transportation device capable of loading plate-shaped heavy objects such as thick plate products without using an additional lifting/unloading apparatus and rapidly transporting the plate-shaped heavy objects to a desired location for reducing the total transportation (distribution) time necessary for lifting, transportation, and unloading of cargo.

An aspect of the present disclosure may also provide a transportation (logistics) system using a compact and practical transportation device for providing efficient transportation environments and improving transportation work or productivity while markedly reducing costs.

Technical Solution

According to an aspect of the present disclosure, a transportation device may include: a device body unit; a device moving unit provided on the device body unit for moving the transportation device; and a cargo loading unit provided on the device body unit for self-loading cargo.

According to another aspect of the present disclosure, a transportation system may include the transportation device, the transportation system being operated by a method including: lifting cargo onto the cargo loading unit of the transportation device by self loading; transporting the cargo to a destination by operating the device moving unit of the transportation device; and unloading the cargo at the destination by reversely operating the cargo loading unit of the transportation device.

Advantageous Effects

According to the present disclosure, plate-shaped heavy objects having a certain area such as slabs, thick plate products, or wood plates may be loaded, transported to a desired location, and unloaded without using an additional lifting/unloading apparatus. Therefore, the total transportation (logistics) time may be markedly reduced.

In addition, since transportation work can be rapidly carried out, a large amount of cargo may be transported or shipped per unit time.

Therefore, according to the present disclosure, innovative and practical features may be obtained in terms of costs and time as compared with the case of using transportation systems of the related art.

In addition, according to the present disclosure, when significantly heavy plates such as thick plate products are lifted, unloaded, or shipped, big accidents or accidents related to worker safety caused by falling products may be basically prevented.

As a result, according to the present disclosure, a transportation (logistics) system for transporting heavy cargo such as thick plate products may be efficiently constructed for improving transportation efficiency and productivity, and markedly reducing costs.

DESCRIPTION OF DRAWINGS

FIG. 1 is a process view illustrating a shipping (transportation) system for shipping thick plate products in the related art.

FIG. 2 is a process view illustrating a shipping (transportation) system using a transportation device 1 according to the present disclosure.

FIG. 3 is a perspective view illustrating the transportation device after the heights of a body unit and a cargo loading unit of the transportation device are simultaneously adjusted according to the present disclosure.

FIG. 4 is a front view illustrating the transportation device illustrated in FIG. 3.

FIG. 5 is a side view illustrating the transportation device illustrated in FIG. 3.

FIG. 6 is a plan view illustrating the transportation device illustrated in FIG. 3.

FIGS. 7 and 8 are perspective views separately illustrating height adjusted states of the body unit and the cargo loading unit of the transportation device according to the present disclosure.

FIG. 9 is an enlarge view illustrating the cargo loading unit of the transportation device according to the present disclosure.

FIGS. 10 to 12 are front views illustrating how the heights of the body unit and the cargo loading unit of the transportation device are adjusted using first and second lifting units according to the present disclosure.

FIG. 13 is a front view illustrating a horizontal movement state of the cargo loading unit of the transportation device according to the present disclosure.

FIGS. 14 and 15 are a perspective view and a partial cut-away view illustrating a device moving unit of the transportation device according to the present disclosure.

FIGS. 16A and 16B are partially cut-away perspective views illustrating a steering unit and a first lifting unit connected to the steering unit in the device moving unit of the transportation device according to the present disclosure.

FIGS. 17 and 18 are an outer side view and an inner side view illustrating a driving unit configured to drive a tire of the device moving unit of the transportation device according to the present disclosure.

FIG. 19 is a view illustrating a guide unit configured to guide horizontal and vertical movements of a cargo loading members (bent plates) of the transportation device according to the present disclosure.

BEST MODE

Hereinafter, embodiments of the present disclosure will be described in detail with reference to the accompanying drawings.

FIG. 2 illustrates a transportation system (shipping system) 200 for transporting cargo 2 such as thick plate products by using a transportation device 1 according to the present disclosure. The transportation device 1 will be described later in detail with reference to FIGS. 3 to 19.

In the descriptions of the embodiments of the present disclosure, thick plate products are described as an example of the cargo 2. However, the transportation device 1 of the present disclosure is not limited to transporting thick plate products.

For example, the transportation device 1 may transport any kind of cargo having a size (area) suitable for being loaded on a cargo loading unit 70 (to be described later in detail) of the transportation device 1 by an elevating (lifting) method (a self loading method not requiring additional equipment or operations). For example, the transportation device 1 may transport cargo such as thick plate products, slabs (after being cooled to some degree before being inserted into a heating furnace), wood plates, steel sheets, stacked steel sheets, or iron structures.

Referring to FIG. 2 provided for comparison with the transportation (shipping) system 300 of the related art illustrated in FIG. 1, it could be understood that the transportation system 200 using the transportation device 1 of the present disclosure is innovative and advantageous in terms of costs as compared to existing transportation systems.

For example, as illustrated in FIG. 2, according to the present disclosure, the transportation system (shipping system) 200 using the transportation device 1 (to be described later in detail with reference to FIGS. 2 to 19) may transport cargo 2 such as thick plate products through a lifting operation S1 in which a thick plate product is self-loaded by only the cargo loading unit 70 of the transportation device 1 without having to perform additional lifting/unloading crane operations and use a pallet, a transportation operation S2 in which the thick plate product is transported to a desired location by operating a device moving unit 30 of the transportation device 1, and an unloading operation S3 in which the cargo loading unit 70 is reversely operated to unload the thick plate product at the desired location.

Herein, the term "self loading" or "self loading method" refers to a case in which cargo is loaded (lifted) and unloaded (stacked) using only the transportation device 1 of the present disclosure as illustrated in FIG. 1 without having to use an additional device such as a crane, a lifting apparatus, or a pallet, or perform an additional operation.

In the above, the desired location may be any location to which transportation device 1 of the present disclosure may move on its wheels. For example, in FIG. 2, a cargo loading space of a ship 210 (or other marine transportation facilities such as a large barge) is illustrated as the desired location.

As illustrated in FIG. 2, self loading of thick plate products (cargo), lifting (elevating) of the thick plate products to desired heights, transportation of the thick plate products to a desired location such as the cargo loading space of the ship 210, unloading of the thick plate products through a reverse operation of the cargo loading unit 70 may be performed rapidly and independently by using only the transportation device 1 of the present disclosure. Then, only the transportation device 1 may return (34).

That is, according to the present disclosure, the transportation system 200 using the transportation device 1 of the present disclosure does not need to use devices illustrated in FIG. 1 such as the crane 320, the lifting apparatus 330, and the heavy pallets 350 or cassettes (not shown) for disposing thick plate products thereon, and it is not necessary to load thick plate products in a ship together with pallets.

Therefore, the transportation system 200 of the present disclosure does not require construction, repair, and management of additional equipment, and loading/unloading operations. In addition, since pallets are not loaded in a ship, costs and shipping space may be saved.

FIGS. 3 to 19 illustrate the transportation device 1 included in the transportation system (shipping system) 200 for transporting thick plate products according to the present disclosure.

FIGS. 3 to 6 are a perspective view, a front view, a side view, and a plan view of the transportation device 1 of the present disclosure, and FIGS. 7 and 8 are perspective views separately illustrating height adjustment states of a body unit and the cargo loading unit 70 of the transportation device 1. FIGS. 9 to 19 are detailed views illustrating constitutional units or parts of the transportation device 1.

Referring to FIGS. 3 to 6, for example, the transportation device 1 of the present disclosure may generally include a device body unit 10 as a framework (frame) of the transportation device 1 (vehicle), a device moving unit 30 provided on the device body unit 10 to move the transportation device 1, and the cargo loading unit 70 configured to place cargo 2 on the device body unit 10 by self loading.

As illustrated in FIG. 3, basically, the transportation device 1 of the present disclosure is capable of self-loading cargo 2 (such as thick plate products) rapidly and independently, moving to a desired unloading location, and self-unloading the cargo 2 rapidly at the desired unloading location. That is, the transportation device 1 is a compact transportation device having functions of lifting/unloading apparatuses, pallets, and other devices of the related art.

That is, in the transportation device 1 of the present disclosure, the device moving unit 30 is used to move the transportation device 1, and cargo loading mechanisms 70 having lifting and unloading functions are lifted after cargo is loaded so as to allow the transportation device 1 to move.

In other words, a transportation function of a vehicle and a loading function of a pallet are integratedly incorporated in the transportation device 1 of the present disclosure.

Hereinafter, main parts of the transportation device 1 such as the device body unit 10, the device moving unit 30, and the cargo loading unit 70 will be described in detail.

First, referring to FIGS. 3 to 6, the device body unit 10 may include: a first body 12 as a main body having a predetermined length; a plurality of second bodies 14 coupled to both sides of the first body 12 at predetermined intervals by using reinforcement parts 13 (refer to FIG. 4) and linked to the cargo loading unit 70; and third bodies 16 coupled to ends of the second bodies 14 at a right angle by a method such as welding and linked to the device moving unit 30.

That is, as illustrated in FIG. 6, in the device body unit 10, the first body 12 forms a main frame of the transportation device 1 (vehicle), and the second bodies 14 are coupled to the first body 12 by the reinforcement parts 13 and are horizontally arranged at predetermined intervals along the first body 12. The third bodies 16 are coupled to lower sides of ends of the second bodies 14 at a right angle and are horizontally arranged.

The bodies 12, 14, and 16 may be iron structures formed by welding steel plates or may be formed by welding shaped steel structures. Although not shown in the drawings, the bodies 12, 14, and 16 may be coupled to each other by welding or bolting using iron pieces.

In addition, the transportation device 1 includes a driver's cage 18 at a front side of the first body 12, and the driver's cage 18 may be equipped with electric, electronic, hydraulic, and pneumatic parts (not shown) necessary for the operation thereof.

As illustrated in FIGS. 4 and 6, the first body 12 of the device body unit 10 is disposed along a centerline of the transportation device 1, and the driver's cage 18 is disposed at a front side of the first body 12 in a traveling direction of the transportation device 1. That is, the driver's cage 18 is disposed at a front side of the transportation device 1 relative to the center of the transportation device 1, and thus when cargo (loading products) such as bulky thick plate products are loaded, the position of the transportation device 1 may be easily set.

In addition, a base 22 is provided in a center region of the first body 12 along the second bodies 14, and a control box 20 is provided on the base 22.

That is, since the transportation device 1 is independently moved, the control box 20 is connected to the device moving unit 30 and the cargo loading unit 70 for supplying electricity and hydraulic/pneumatic power to the device moving unit 30 and the cargo loading unit 70 and controlling the device moving unit 30 and the cargo loading unit 70. The control box 20 may include elements such as a charger, an electric generator, a hydraulic/pneumatic pressure generator (e.g., a compressor), and a control panel that are necessary for moving and operating the transportation device 1.

In addition, various sensors may be provided on the bodies 12, 14, and 16 of the device body unit 10 for controlling operations such as travelling of the transportation device 1, lifting (elevating) and lowering operations of the bodies 12, 14, and 16, and the cargo loading unit 70 when loading cargo, vertical movements and lifting/lowering operations of loading mechanisms when loading cargo.

For example, sensors such as limit sensors, proximity sensors, and laser sensors may be used to precisely control the transportation device 1. Such sensors may be connected to the control panel of the control box 20 and may be operated according to control commands from the driver's cage 18 to control operations of various devices.

In the related art, cargo is generally loaded on an upper portion of a transportation device using a crane. In the present disclosure, however, cargo is lifted from the ground (yard) and loaded on the transportation device 1. That is, since cargo is loaded on a lower portion of the transportation device 1 by self loading, the transportation device 1 may be compact.

As described above, the transportation device 1 is a vehicle onto which cargo such as thick plate product is lifted and loaded by self loading. Therefore, after cargo is loaded on the transportation device 1, it may be necessary to adjust the heights of the device body unit 10 and/or the cargo loading unit 70 before the transportation device 1 is moved.

For example, FIG. 3 illustrates a state in which both the device body unit 10 and the cargo loading unit 70 are lifted (elevated) for lifting cargo 2 as high as possible. FIGS. 7 and 8 respectively illustrate a state in which only the device body unit 10 is lifted for lifting cargo at a predetermined height and a state in which only the cargo loading unit 70 is lifted for loading cargo at a predetermined height.

This may be understood more clearly with reference to front views of the transportation device 1 illustrated in FIGS. 10 to 12.

For example, the transportation device 1 of the present disclosure includes a first lifting unit 40 (described later in detail) disposed on a side of the device moving unit 30 and a second lifting unit 76 (described later in detail) disposed on a side of the cargo loading unit 70 so as to perform a two-step lifting (elevating) operation (indicated by "X" and "Y" in FIGS. 10 to 12). Therefore, as illustrated in FIG. 4, even when cargo 2 such as thick plate products stacked in multiple layers using base blocks 2' are loaded and unloaded, that is, even when thicknesses and heights of thick plate products are varied, loading and unloading of the thick plate products may be rapidly performed by two-step lifting operations of the transportation device 1. For example, FIG. 10 illustrates a height variation amount X by the first lifting unit 40, FIG. 11 illustrates a height variation amount Y by the second lifting unit 76, and FIG. 12 illustrates a height variation amount X+Y which is the sum of the height variation amounts X and Y illustrated in FIGS. 10 and 11. According to the present disclosure, the heights of the device body unit 10 and the cargo loading unit 70 of the transportation device 1 may be easily adjusted.

That is, in the present disclosure, since the heights of the device body unit 10 and the cargo loading unit 70 of the transportation device 1 are independently adjusted, the transportation device 1 may travel safely with optimized traveling conditions according to road conditions.

FIG. 13 illustrates horizontal movements of cargo loading members 88 (described later in detail) of the cargo loading unit 70. That is, cargo may be loaded and transported even in cargo width varying conditions.

That is, the transportation device 1 of the present disclosure may be sufficiently adapted for use in varying cargo conditions such as widths, lengths, thicknesses, or loading heights so as to rapidly load cargo thereon by a self loading method without using additional equipment and to rapidly transport the cargo.

Next, as illustrated in FIGS. 3, 4, and 14 to 16, the device moving unit 30 of the transportation device 1 of the present disclosure basically includes steering units 32 provided on the third bodies 16, and tires 34 provided on connecting arms (locking arms) 43 vertically linked to the steering units 32. Some selected from the tires 34 receive power from driving units 36 to move the transportation device 1.

That is, as illustrated in FIGS. 3 and 5, since the transportation device 1 transports significantly heavy, plate-shaped cargoes having certain areas such as thick plate products, the transportation device 1 needs many tires 34 for supporting weights and stably transporting the cargoes. For example, the transportation device 1 may include ten tires 34 on each side thereof in consideration of longest, widest, and heaviest thick plate products, and about three to four of the ten tires 34 (totally about six to eight) may be linked to driving units 36 to receive power for moving the transportation device 1.

The number of tires 34 linked to driving units 36 for receiving power may be varied.

FIGS. 14 and 15 illustrate a tire 34 linked to a driving unit 36. Referring to FIGS. 15 and 17, in the case of an idling tire 34 not linked to a driving unit 36, a shaft (not shown) of a vertical connecting arm (locking arm) 43 linked to a steering unit 32 and a first lifting unit 40 may be coupled to a wheel 56 by using a bearing member (shaft bearing part).

The idling tire 34 to which power is not transmitted is also connected to a steering unit 32 so as to control the moving direction thereof. That is, the direction of each of the tires 34 of the transportation device 1 is controlled, and thus when the transportation device 1 transports cargo such as large thick plate products, the direction of the transportation device 1 may be stably controlled.

The above-described first lifting unit 40 may be linked between the steering unit 32 and the connecting arm 43 for lifting the device body unit 10.

That is, as illustrated in FIGS. 3, 4, and 14 to 16, the first lifting unit 40 includes a casing 42 vertically penetrating the third body 16, and an actuation rod 44 disposed in the casing 42. A lower end of the actuation rod 44 is connected to the connecting arm (locking arm) 43 linked to the tire 34.

In this case, as illustrated in FIGS. 11 and 14, a flange 42a of the casing 42 may be bolted to an assembling hole of the third body 16.

In the casing 42, a piston part 44a vertically movable by hydraulic pressure may be disposed on top of the actuation rod 44.

In addition, as illustrated in FIGS. 14, 15, and 16, the steering unit 32 of the device moving unit 30 may include a rotation support 46 disposed in the casing 42 of the first lifting unit 40. The actuation rod 44 may be disposed around the rotation support 46, and a spline structure known in the related art may be formed between the actuation rod 44 and the rotation support 46 for transmitting rotational force through a sliding motion.

In this case, rotational force may be transmitted through a sliding motion of the spline structure. For example, since the actuation rod 44 is attached to an outer side of the rotation support 46 through a spline structure, the actuation rod 44 may be engaged with the rotation support 46 and may receive rotational force from the rotation support 46 while being moved forward and backward in a vertical direction owing to engaging structures (such as protrusions and grooves, or keys and key grooves). Therefore, steering may be performed through rotations of the actuation rod 44, the connecting arm 43, and the tire 34.

An upper end portion of the rotation support 46 penetrates the casing 42 and protrudes from the casing 42 in a sealed state. A gear portion 48 is formed along the circumference of the protruded upper end portion of the rotation support 46, and rack parts 51 are provided on the casing 42, for example, between a pair of horizontal driving cylinders 50 and are engaged with the gear portion 48.

Therefore, if the horizontal driving cylinders 50 are moved forwards or backwards, the rack parts 51 rotate the rotation support 46. Then, the actuation rod 44 attached to the rotation support 46 by the spline structure may receive rotational force and rotate together with the rotation support 46, and thus the connecting arm (locking arm) 43 connected to the lower end of the actuation rod 44 may also rotate to rotate the tire 34. In this manner, direction controlling, that is, steering, may be performed.

That is, the amount of rotation of the tire 34 (the steering angle of the tire 43) may be controlled according to the amount of forwards or backwards movement of the horizontal driving cylinders 50 of the steering unit 32 (steering power is boosted because the horizontal driving cylinders 50 connected to both the rack parts 51 may be alternately moved forward and backward).

The actuation rod 44 may be lifted or lowered in the casing 42 by the piston part 44a according to hydraulic pressure, and then, the third body 16, the second body 14, and the first body 12 connected thereto may be lifted or lowered to vary the height of the device body unit 10.

As described above, the steering units 32 are respectively connected to all the tires 34 through the actuation rods 44 and the connecting arms 43, and steering angles of the steering units 32 may be previously set.

Therefore, since the tires 34 of the transportation device 1 are respectively linked to the steering units 32 and are steered as illustrated in FIG. 3, traveling of the transportation device 1 having a significantly long length may be controlled precisely and stably even on a curved road.

In addition, a box assembly 53 is attached to a center portion of the steering unit 32 in which the rack parts 51 and the horizontal driving cylinders 50 are disposed, so as to prevent wobbling during operations. The box assembly 53 is fixed to the casing 42, and the casing 42 is inserted through the third body 16 and fixed to the third body 16 using the flange 42a.

Next, FIGS. 14, 15, 17, and 18 illustrate the driving unit 36 configured to supply power to the tire 34 in the device moving unit 30 of the transportation device 1 of the present disclosure.

In the present disclosure, the driving unit 36 includes: a hydraulic motor 54 attached to a housing 52 to which the connecting arm 43 is fixed in a state in which the steering unit 32 and the actuation rod 44 of the first lifting unit 40 disposed below the steering unit 32 are connected to the connecting arm 43 (actually, the steering unit 32 and the first lifting unit 40 are coupled and interlinked rather than the first lifting unit 40 is disposed below the steering unit 32); and a reduction gear assembly 58 disposed in the housing 52 and rotatably connected to the hydraulic motor 54 for applying rotational force. The wheel 56 to which the tire 34 is attached is fixed to the reduction gear assembly 58.

Therefore, as illustrated in FIGS. 17 and 18, rotational force of the hydraulic motor 54 may be transmitted to the wheel 56 through the reduction gear assembly 58 for rotating the tire 34.

For example, FIG. 18 illustrates the inside structure of the reduction gear assembly 58. The hydraulic motor 54 is attached to the housing 52 using bolts B, and the connecting arm 43 is bolted to the housing 52. A body part 54a to which a hydraulic system is connected is disposed on a side of the hydraulic motor 54.

The hydraulic system may be connected (using a flexible tube) in consideration of the maximum steering angle of the tire 34.

A coupler 58a of the reduction gear assembly 58, to which a rotation shaft 54b of the hydraulic motor 54a is connected to transmit power, is engaged with a central sun gear 58b, and the central sun gear 58b is engaged with outer planetary gears 58c. In addition, the planetary gears 58c are engaged with an internal gear part S of a rotor 58d, and the wheel 56 is attached to the outside of the rotor 58d.

Therefore, the rotor 58d having a cylindrical shape may be rotated on a bearing 57 of the housing 52 by rotational force of the hydraulic motor 54 at a reduction ratio determined by the sun gear 58b and the planetary gears 58c. The (assembling) bolts B of the rotor 57 penetrate the wheel 56 to which the tire 34 is attached and are held by nuts N.

At this time, other planetary gears 58e and 58f engaged with the sun gear 58b are rotated together with the sun gear 58b in a state in which the planetary gears 58e and 58f are engaged with the internal gear part S of the rotor 58d, and thus the operation of the reduction gear assembly 58 is stabilized.

In this manner, the tire 34 of the transportation device 1 is driven by the driving unit 36, that is, by the hydraulic motor 54 and the rotor 58d of the reduction gear assembly 58 to which the wheel 56 is attached.

The connecting arm (locking arm) 43 may be a structure formed of a plate, and a lower portion of the connecting arm 43 may be partially opened so as to be attached to the housing 52 of the reduction gear assembly 58 in a surrounding manner while allowing for the attachment of the hydraulic motor 54.

Next, FIGS. 3, 4, and 9 (refer to FIGS. 10 to 13) illustrate the cargo loading unit 70 of the transportation device 1 which is a self-loading type cargo loading unit configured to lift (elevate) and load cargo 2 such as a thick plate product by a self loading method without using additional equipment, lifting apparatuses, or cranes, or performing additional operations. The cargo loading unit 70 includes: cargo loading mechanisms 74 facing each other and movable toward or away from each other on the second body 14 through a horizontally moving unit 72 for loading cargo on lower end portions thereof; and a second lifting unit 76 provided between the horizontally moving unit 72 and cargo loading mechanisms 74 for lifting cargo.

That is, as illustrated in FIGS. 3, 4, and 9, according to the present disclosure, the cargo loading mechanisms 74 disposed at both sides of the cargo loading unit 70 and facing each other are configured to be lifted, lowered, and moved toward and away from each other by the horizontally moving unit 72.

That is, as illustrated in FIG. 4, the transportation device 1 of the present disclosure may load cargo 2 such as a thick plate product rapidly and precisely on a desired location thereof by using the cargo loading mechanisms 74 capable of moving horizontally and vertically, and then the transportation device 1 may move by means of the device moving unit 30.

For this, as illustrated in FIGS. 3, 9, and 19, the horizontally moving unit 72 includes a pair of movable blocks 78 equipped with moving wheels 78b capable of moving along a rail 78a attached to a center portion of the second body 12

(across the first body 12), and a movable arm 82 having a predetermined length is connected between the movable blocks 78.

For example, a pair of mutually-facing movable blocks 78 may be attached to both sides of the movable arm 82.

In addition, the horizontally moving unit 72 of the present disclosure includes horizontal driving cylinders 80 alternately connected between the second body 14 and the movable blocks 78 disposed at both sides of the second body 14.

For example, as illustrated in FIGS. 6 and 9, a rod of a horizontal driving cylinder 80 is connected through a pin to a hinge bracket 81 attached to one of the movable blocks 78, and a body (indicated with no reference numeral) of the horizontal driving cylinder 80 is connected through a pin to another hinge bracket 81 attached to a side of the second body 14.

Similarly, as illustrated in FIG. 6, a horizontal driving cylinder 80 neighboring the horizontal driving cylinder 80 or operating in an opposite direction is connected to the other side of the second body 14 and the other movable block 78 in the same manner.

That is, as a pair of neighboring horizontal driving cylinders 80 of the horizontally moving unit 72 are moved forward and backward in opposite directions, the movable blocks 78 linked thereto and the movable arm 82 horizontally connected therebetween along the first body 12 are moved toward or away from each other in the width direction of the first body 12, the length direction of the second bodies 14, or the width direction of the transportation device 1 when viewed from the front side of the transportation device 1 as in FIG. 13.

Owning to this structure, the cargo loading mechanisms 74 may be horizontally moved to load cargo 2 such as a thick plate product even in the case that the thick plate product has a different width.

The horizontally movable range of the cargo loading mechanisms 74 may be adjusted according to conditions of cargo such as the maximum and minimum widths of thick plate products. The cargo loading mechanisms 74 may be moved toward or away from each other based on the center of the transportation device 1, that is, the centerline of the first body 12.

In this case, as illustrated in FIGS. 3, 4, 6, and 9, the second lifting unit 76 provided on the movable arm 82 and linked to the cargo loading mechanisms 74 may include one or more vertical driving cylinders vertically disposed on both sides of the movable arm 82 connected between the movable blocks 78, and the cargo loading mechanisms 74 may be linked to the vertical driving cylinders.

For example, the vertical driving cylinders of the second lifting unit 76 may include actuation rods 84a vertically disposed on the movable arm 82, and cylinder bodies 84b linked to the cargo loading mechanisms 74 and attached to the actuation rods 84a. Therefore, when the vertical driving cylinders are moved forwards or backwards, the cylinder bodies 84b are lifted or lowered to lift or lower the cargo loading mechanisms 74.

That is, in the second lifting unit 76 including the vertical driving cylinders, the cylinder bodies 84b are lifted or lowered unlike a usual case in which the actuation rods 84a are moved forwards or backwards.

The cargo loading mechanisms 74 for loading cargo 2 such as thick plate products may include cargo loading members 88 attached to lifting rods 86 into which the cylinder bodies 84b of the second lifting unit 76 (vertical driving cylinders) are inserted. For example, the number of the cargo loading members 88 may be three for each of the lifting rods 86 as illustrated in FIG. 3.

That is, as illustrated in FIG. 3, three cargo loading members 88 may be provided on each of four lifting rods 86 disposed at left, right, front, and rear sides of the transportation device 1. The cargo loading members 88 may be horizontally moved in left and right directions within a range corresponding to the distance between tires 34.

As illustrated in FIGS. 4 and 9, each of the cargo loading members 88 may be divided into a member body such as a body attachment portion 88a attached to the lifting rod 86 by a method such as welding, a vertical portion 88b bent from the body attachment portion 88a with reinforcement plates being attached therebetween, and a fork portion 88c horizontally formed on a lower end of the vertical portion 88b and having at least one gap for being inserted between cargo 2 and a pallet or a base block to support a lower side of the cargo 2 and load the cargo 2.

For example, the fork portion 88c may be shaped like a fork structure of a forklift so as to be easily inserted between pallets or base blocks.

Therefore, as described with reference to FIGS. 10 to 13, while the cargo loading members 88 are moved toward or away from each other by the horizontally moving unit 72 and lifted or lowered to a desired height by the second lifting unit 76 (vertical driving cylinders), the cargo loading members 88 may load cargo 2 such as a thick plate product thereon and lift the cargo 2 from the ground so that the transportation device 1 may transport the cargo 2.

That is, cargo may be easily loaded (lifted) or unloaded by operating the cargo loading mechanisms 74 in the reverse order.

Next, FIG. 19 illustrates a guide unit 90 additionally included in the transportation device 1 of the present disclosure.

Referring to FIG. 19, the guide unit 90 includes: a first guide bar 92 disposed between the movable arm 82 and the lifting rod 86 and penetrating the lifting rod 86 for guiding lifting and lowering operations of the lifting rod 86; and a second guide bar 94 inserted between the cargo loading members 88 to guide horizontal movements of the cargo loading members 88.

Owning to the first and second guide bars 92 and 94, lifting and lowering of the lifting rod 86, and lifting, lowering, and horizontal moving of the cargo loading members 88 may be stably performed, and during traveling, cargo may be stably maintained in a loaded state.

Rings (not indicated with reference numerals) may be disposed in openings of the lifting rod 86 and the cargo loading members 88 into which the guide bars 92 and 94 are inserted, so as to reduce friction therebetween.

In addition, as illustrated in FIG. 19, the transportation device 1 may further include: a first stopper 98 making elastic contact with the lifting rod 86, inserted in the first guide bar 92, by means of a spring when the lifting rod 86 is lifted; and second stoppers 102 disposed on both sides of the second guide bar 94 with a predetermined distance therebetween for making elastic contact with the cargo loading members 88 by means of springs when the cargo loading members 88 are horizontally moved.

In this case, a fixing pipe 140 having a height-adjustable double-pipe structure formed by pipes 104a and 104b may be connected to a center portion of the second guide bar 94 in a direction perpendicular to the second body 14 to support the center portion of the second guide bar 94 even though the height of the fixing pipe 140 is varied.

The guide bars 92 and 94 may be positioned not to interfere with parts of the transportation device 1.

Therefore, since the first and second stoppers 98 and 102 limit the lifting range of the lifting rod 86 and the vertical movable range of the cargo loading members 88, improper operations of the transportation device 1 may be prevented or stopped.

That is, the guide unit 90 illustrated in FIG. 19 may support and stably maintain vertical movements of the lifting rod 86 and horizontal and vertical movements of the cargo loading members 88. The guide unit 90 may be more useful when excessive vibrations occur during transport.

INDUSTRIAL APPLICABILITY

As described above, according to the transportation device 1 of the present disclosure, and the transportation system 200 including the transportation device 1, various kinds of equipment used in the related may not be used. Particularly, since the transportation device 1 is compact and capable of performing loading, transportation, unloading of cargo, transportation time and costs may be markedly reduced.

The invention claimed is:

1. A transportation device comprising:
   a device body unit;
   a device moving unit provided on the device body unit for moving the transportation device;
   a cargo loading unit provided on the device body unit for self-loading cargo,
      wherein the device moving unit comprises:
         a steering unit provided on the device body unit to control a moving direction of the transportation device; and
         a tire provided on a connecting arm linked to the steering unit,
         wherein at least a selected tire of the device moving unit receives power from a driving unit; and
   a first lifting unit linked between the steering unit and the connecting arm to vary a height of the device body unit,
      wherein the first lifting unit is a vertical cylinder comprising:
         a casing; and
         an actuation rod disposed in the casing and connected to the connecting arm at a lower end thereof, and
      wherein the steering unit comprises:
         a rotation support coupled to the actuation rod in the casing by a spline structure to apply rotational force to the actuation rod; and
         at least one horizontal driving cylinder provided on the casing and linked to a rack part, the rack part being engaged with a gear portion formed on a portion of the rotation support protruding from the casing.

2. The transportation device of claim 1, wherein the cargo loading unit is provided on the device body unit to load the cargo on a lower portion of the transportation device by self-loading.

3. The transportation device of claim 2, wherein the cargo loading unit is movable on the device body unit in multiple directions for self-loading the cargo.

4. The transportation device of claim 1, wherein the device body unit comprises:
   a first body as a main body;
   a second body provided on the first body and linked to the cargo loading unit; and
   a third body attached to the second body and linked to the device moving unit.

5. The transportation device of claim 4, wherein the cargo loading unit comprises:
   cargo loading mechanisms movable in mutually-facing directions at both sides of a second body of the device body unit by means of a horizontally moving unit; and
   a second lifting unit disposed between the horizontally moving unit and the cargo loading mechanisms,
   wherein the cargo loading unit is configured to self-load the cargo on the lower portion of the transportation device through horizontal and vertical movements.

6. The transportation device of claim 5, wherein the horizontally moving unit comprises:
   a movable arm connected to a movable block capable of moving along the second body and linked to the cargo loading mechanisms; and
   a horizontal driving cylinder connected between the movable block and the second body.

7. The transportation device of claim 6, wherein the movable block comprises a movable wheel capable of moving along a rail provided on the second body.

8. The transportation device of claim 6, wherein the second lifting unit is a vertical driving cylinder comprising an actuation rod and a cylinder body so as to vary a loading height of the cargo, the actuation rod being attached to the movable arm, the cylinder body being linked to the cargo loading mechanisms and coupled to the actuation rod.

9. The transportation device of claim 8, wherein each of the cargo loading mechanisms comprises:
   a lifting rod in which the cylinder body is inserted, the lifting rod having a predetermined length; and
   at least one vertical cargo loading member provided on the lifting rod,
   wherein cargo loading members cooperatively load the cargo while being moved at both sides of the cargo in mutually-facing directions.

10. The transportation device of claim 9, wherein each of the cargo loading members comprises:
    a member body fixed to the lifting rod; and
    at least one fork part provided on a lower portion of the member body to load the cargo thereon.

11. The transportation device of claim 9, further comprising a guide unit, the guide unit comprising:
    a first guide bar disposed between the movable arm and the lifting rod and penetrating the lifting rod for guiding upward and downward movements of the lifting rod; and
    a second guide bar inserted through the cargo loading members for guiding a horizontal movement of the cargo loading members.

12. The transportation device of claim 4, further comprising:
    a driver's cage provided on the first body; and
    a control box provided on the first body and linked to the device moving unit and the cargo loading unit so as to supply electricity and hydraulic/pneumatic power to the device moving part and the cargo loading unit and control operations of the device moving unit and the cargo loading unit.

13. The transportation device of claim 1, wherein the driving unit comprises:
    a reduction gear assemble comprising a housing to which the connecting arm is fixed and a rotor linked to a wheel to which the tire is attached; and a hydraulic motor attached to the housing and linked to the reduction gear assembly so as to provide power to the wheel linked to the rotor.

14. The transportation device of claim 1, wherein the cargo is a plate-shaped weight loadable on the cargo loading unit.

* * * * *